(12) United States Patent
Um et al.

(10) Patent No.: US 9,164,833 B2
(45) Date of Patent: Oct. 20, 2015

(54) DATA STORAGE DEVICE, OPERATING METHOD THEREOF AND DATA PROCESSING SYSTEM INCLUDING THE SAME

(71) Applicant: SK hynix Inc., Gyeonggi-do (KR)

(72) Inventors: Gi Pyo Um, Gyeonggi-do (KR); Jong Ju Park, Gyeonggi-do (KR)

(73) Assignee: SK Hynix, Gyeonggi-do (KR)

( * ) Notice: Subject to any disclaimer, the term of this patent is extended or adjusted under 35 U.S.C. 154(b) by 78 days.

(21) Appl. No.: 14/081,648

(22) Filed: Nov. 15, 2013

(65) Prior Publication Data

US 2015/0052415 A1   Feb. 19, 2015

(30) Foreign Application Priority Data

Aug. 13, 2013   (KR) .................. 10-2013-0095900

(51) Int. Cl.
*G11C 29/00* (2006.01)
*G06F 11/10* (2006.01)

(52) U.S. Cl.
CPC ........ *G06F 11/1056* (2013.01); *G06F 11/1068* (2013.01)

(58) Field of Classification Search
None
See application file for complete search history.

(56) References Cited

U.S. PATENT DOCUMENTS

| | | | | |
|---|---|---|---|---|
| 7,650,460 B2 * | 1/2010 | Cheriton | | 711/108 |
| 8,111,548 B2 * | 2/2012 | Mokhlesi | | 365/185.03 |
| 8,244,960 B2 * | 8/2012 | Paley et al. | | 711/103 |
| 8,495,283 B2 * | 7/2013 | Park et al. | | 711/103 |
| 8,499,124 B2 * | 7/2013 | Guthrie et al. | | 711/141 |
| 8,825,941 B2 * | 9/2014 | Moshayedi et al. | | 711/103 |
| 2007/0050564 A1 * | 3/2007 | Gunna et al. | | 711/146 |
| 2008/0307166 A1 * | 12/2008 | Gunna et al. | | 711/140 |
| 2008/0307167 A1 * | 12/2008 | Gunna et al. | | 711/143 |
| 2009/0254572 A1 * | 10/2009 | Redlich et al. | | 707/10 |
| 2011/0055623 A1 * | 3/2011 | Kim et al. | | 714/5 |
| 2011/0307646 A1 * | 12/2011 | Lee et al. | | 711/103 |
| 2012/0284587 A1 * | 11/2012 | Yu et al. | | 714/773 |
| 2012/0311388 A1 * | 12/2012 | Cronin et al. | | 714/42 |
| 2013/0124525 A1 * | 5/2013 | Anderson et al. | | 707/737 |
| 2014/0006693 A1 * | 1/2014 | Byun | | 711/103 |
| 2014/0059406 A1 * | 2/2014 | Hyun et al. | | 714/773 |
| 2014/0173183 A1 * | 6/2014 | Shin et al. | | 711/103 |
| 2014/0173231 A1 * | 6/2014 | Lee et al. | | 711/162 |
| 2014/0310574 A1 * | 10/2014 | Yu et al. | | 714/773 |
| 2015/0019796 A1 * | 1/2015 | Byun | | 711/103 |

FOREIGN PATENT DOCUMENTS

KR   1020120100912   9/2012

* cited by examiner

*Primary Examiner* — Daniel McMahon
(74) *Attorney, Agent, or Firm* — IP & T Group LLP (57) ABSTRACT

A data storage device includes a nonvolatile memory device; and a controller suitable for controlling an operation of the nonvolatile memory device in response to a request from an external device, wherein the controller comprises a victim block setup unit suitable for setting a victim block for a merge operation based on an error count, which is detected when a read operation of the nonvolatile memory device is performed, and for storing information of the victim block for the merge operation, and wherein the controller converts the victim block into a free memory block during the merge operation and reuses the free memory block to store data.

20 Claims, 8 Drawing Sheets

DATA STORAGE DEVICE, OPERATING METHOD THEREOF AND DATA PROCESSING SYSTEM INCLUDING THE SAME

CROSS-REFERENCES TO RELATED APPLICATION

The present application claims priority under 35 U.S.C. §119(a) to Korean application number 10-2013-0095900, filed on Aug. 13, 2013, in the Korean Intellectual Property Office, which is incorporated herein by reference in its entirety.

BACKGROUND

1. Technical Field

Various exemplary embodiments relate to a data storage device, and more particularly, to a data storage device capable of effectively performing a merge operation, an operation method thereof, and a data processing system including the same.

2. Related Art

The recent paradigm for computer surroundings has changed into ubiquitous computing environments in which computer systems may be used anytime and anywhere. Thus, the use of portable electronic devices such as mobile phones, digital cameras, and notebook computers has rapidly increased. Such portable electronic devices generally employ a data storage device using a memory device. The data storage device is used as a main memory device or auxiliary memory device of the portable electronic devices.

Since the data storage device using a memory device has no mechanical driver, the data storage device has excellent stability and durability. Furthermore, the data storage device has high access speed and small power consumption. The data storage device having such advantages includes a universal serial bus (USB) memory device, a memory card having various interfaces, and a solid state drive (SSD).

As portable electronic devices play a large file such as music file and video file, the data storage device is required to have a large storage capacity. The data storage device includes a memory device having a high integration degree for memory cells to secure a large storage capacity, for example, a flash memory device, which is one of nonvolatile memory devices.

The flash memory device does not support an overwrite operation due to structural characteristics thereof. That is, the flash memory device may not update data of a programmed memory cell. Thus, an erase operation must be preceded in order to program data to the flash memory device. This operation is referred to as an erase-before-program operation. That is, a programmed memory cell of the flash memory device must be returned to an initial state or erase state before data is programmed.

However, the erase operation of the flash memory device requires a long time. For this reason, after erasing a programmed memory cell, a controller to control the flash memory device in the data storage device does not program data to the erased memory cell. Instead, the controller programs data, which is to be written to the programmed memory cell, to another memory cell returned to an erase state.

For this operation of the controller, memory cells of the flash memory device may store both of valid data and invalid data. Depending on cases, the controller performs a merge operation of collecting valid data in one space and erasing invalid data.

SUMMARY

Various exemplary embodiments are directed to a data storage device capable of effectively performing a merge operation, an operation method thereof, and a data processing system including the same.

In an exemplary embodiment of the present invention, a data storage device may include a nonvolatile memory device; and a controller suitable for controlling an operation of the nonvolatile memory device in response to a request from an external device, wherein the controller comprises a victim block setup unit suitable for setting a victim block for performing a merge operation, based on an error count, which is detected when a read operation of the nonvolatile memory device is performed, and for storing information of the victim block.

In an exemplary embodiment of the present invention, there is provided an operating method of a data storage device, which includes a victim block setup unit. The operating method may include selecting an initial victim block based on victim block information stored in the victim block setup unit, comparing an error count of the initial victim block with a reference value, selecting the initial victim block as a final victim block, or selecting the final victim block by retrieving other victim blocks, in response to a comparison result, selecting a merge block into which valid data of the final victim block are to be copied, and performing a merge operation of copying the valid data of the final victim block into the merge block.

In an exemplary embodiment of the present invention, a data processing system may include a host device, and a data storage device suitable for storing data processed by the host device. The data storage device may include a nonvolatile memory device, and a controller suitable for controlling an operation of the nonvolatile memory device in response to a request from the host device, and wherein the controller comprises a victim block setup unit suitable for setting a victim block for performing a merge operation based on an error count, which is detected when a read operation of the nonvolatile memory device is performed, and storing information of the victim block.

BRIEF DESCRIPTION OF THE DRAWINGS

Features, aspects, and embodiments are described in conjunction with the attached drawings, in which.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and in some instances, proportions may have been exaggerated in order to clearly illustrate features of the embodiments. In this specification, specific terms have been used. The terms are used to describe the present invention, and are not used to qualify the sense or limit the scope of the present invention.

In this specification, 'and/or' represents that one or more of components arranged before and after 'and/or' is included. Furthermore, 'connected/coupled' represents that one component is directly coupled to another component or indirectly coupled through another component. In this specification, a singular form may include a plural form as long as it is not specifically mentioned in a sentence. Furthermore, 'include/comprise' or 'including/comprising' used in the specification represents that one or more components, steps, operations, and elements exists or are added.

Hereafter, the exemplary embodiments of the present invention will be described with reference to the drawings.

Figure 1:
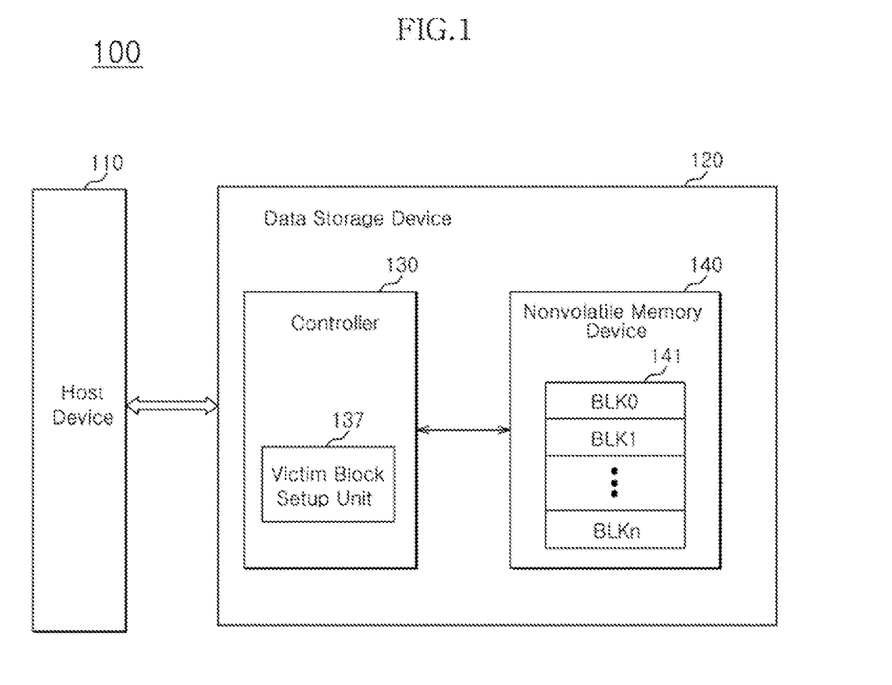
FIG. 1 is a block diagram illustrating a data processing system including a data storage device according to an exemplary embodiment of the present invention.

FIG. 1 is a block diagram illustrating a data processing system including a data storage device according to an exemplary embodiment of the present invention.

Referring to FIG. 1, the data processing system 100 may include a host device 110 and a data storage device 120.

The host device 110 may include portable electronic devices such as mobile phones, MP3 players and lap-top computers or electronic devices such as desktop computers, game machines, TVs, beam projectors and car entertainment system.

The data storage device 120 may operate in response to a request from the host device 110. The data storage device 120 may store data accessed or processed by the host device 110. That is, the data storage device 120 may serve as a main memory device or auxiliary memory device of the host device 110. The data storage device 120 may be referred to as a memory system. The data storage device 120 may be implemented with a memory card. The data storage device 120 may be implemented with a solid state drive (SSD). The data storage device 120 may be coupled to the host device 110 through various interfaces.

The data storage device 120 may include a controller 130 and a nonvolatile memory device 140. The controller 130 may control the nonvolatile memory device 140 in response to the request from the host device 110. For example, the controller 130 may provide data read from the nonvolatile memory device 140 to the host device 110, and may store the data provided from the host device 110 in the nonvolatile memory device 140. For this operation, the controller 130 may control read, program (or write), and erase operations of the nonvolatile memory device 140.

The nonvolatile memory device 140 may comprise a plurality of memory blocks 141 and may serve as a storage medium of the data storage device 120. Hereafter, the nonvolatile memory device 140 implemented with a NAND flash memory device will be taken as an example. However, the nonvolatile memory device 140 may include any one of various types of nonvolatile memory devices such as a NOR flash memory device, a ferroelectric random access memory (FRAM) using a ferroelectric capacitor, a magnetic RAM (MRAM) using a tunneling magneto-resistive (TMR) layer, a phase change memory device (PRAM) using chalcogenide alloys, and a resistive memory device (ReRAM) using transition metal oxide, and the like. The nonvolatile memory device 140 may be implemented with a combination of a NAND flash memory device and the above-described various types of the nonvolatile memory devices.

The controller 130 may execute firmware or software for controlling overall operations of the data storage device 120. The nonvolatile memory device 140 may perform a read or program operation in units of pages due to structural characteristics thereof. Furthermore, the nonvolatile memory device 140 may perform an erase operation in units of blocks due to the structural characteristics thereof. The nonvolatile memory device may not perform an overwrite operation due to the structural characteristics thereof. This may mean that a memory cell of the nonvolatile memory device 140, in which data is stored, may store new data after erasing the data stored in the memory cell. Because of such characteristics of the nonvolatile memory device 140, the controller 130 may execute additional firmware referred to as a flash translation layer (FTL).

The FTL may manage read, program, and erase operations of the nonvolatile memory device 140 so that the data storage device 120 operates in response to an access, e.g., read or write operation, requested from a file system of the host device 110. Furthermore, the FTL may manage additional operations due to the characteristics of the nonvolatile memory device 140. For example, the FTL may manage a garbage collection operation due to a characteristic that an overwrite operation may not be performed. For another example, the FTL may manage a wear-leveling operation due to a characteristic that the number of program and erase operations is limited. For another example, the FTL may manage a bad block management operation due to a characteristic that a block having a defect is allowed.

The FTL may perform a merge operation while the additional operations such as the garbage collection operation, the wear-leveling operation, and the bad block management operation are performed due to the characteristics of the nonvolatile memory device 140. The merge operation may be performed through an operation of collecting valid data in one space and erasing invalid data. For example, the merge operation may include an operation of copying valid data of a memory block, in which the merge operation is to be performed (hereafter, referred to as a 'victim block'), into a free memory block (hereafter, referred to as a 'merge block'). Furthermore, the merge operation may include an operation of converting the victim block into the free memory block after erasing data in the victim block, or setting the victim block to a bad block.

In order to perform the merge operation, a victim block must be selected from memory blocks BLK0 to BLKn in advance. According to the exemplary embodiment of the present invention, a victim block setup unit 137 sets the victim block based on error counts of the memory blocks BLK0 to BLKn or pages included in the memory blocks BLK0 to BLKn, and stores information regarding the victim block (hereafter, referred to as a 'victim block information'). The victim block setup unit 137 may be implemented with hardware. Alternatively, the victim block setup unit 137 may be implemented with a combination of hardware and software.

Figure 2:
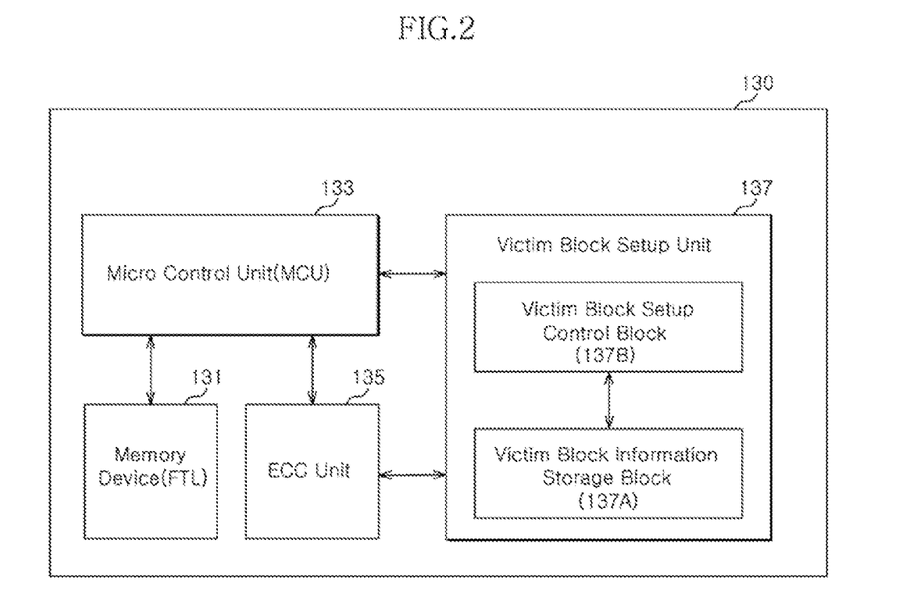
FIG. 2 is a block diagram illustrating a controller for controlling a data storage device according to an exemplary embodiment of the present invention.

FIG. 2 is a block diagram illustrating the controller 130 for the data storage device 120 according to an exemplary embodiment of the present invention.

Referring to FIG. 2, the controller 130 may include a memory device 131, a micro control unit (MCU) 133, an error correction code (ECC) unit 135 and a victim block setup unit 137.

The memory device 131 may store firmware or software and data required for the operation of the controller 130. That is, the memory device 131 may operate as a working memory device of the MCU 133. The memory device 131 may temporarily store data which is to be transmitted from the host device 110 to the nonvolatile memory device 140, or transmitted from the nonvolatile memory device 140 to the host device 110. That is, the memory device 131 may serve as a buffer memory device or cache memory device.

The MCU 133 may control overall operations of the controller 130 through the firmware or software loaded into the memory device 131.

The ECC unit 135 may detect and correct an error of data read from the nonvolatile memory device 140 of FIG. 1. The ECC unit 135 may be implemented with any one of hardware and software. Alternatively, the ECC unit 135 may be implemented with a combination of hardware and software.

The victim block setup unit 137 may include a victim block information storage block 137A and a victim block setup control block 137B. The victim block information storage block 137A may store victim block information such as an address of a memory block set to a victim block and an error count of the memory block set to the victim block. The victim block setup control block 137B may receive an error count of the read data from the ECC unit 135, and compare the error count received from the ECC unit 135 with the error count stored in the victim block information storage block 137A. The victim block setup control block 137B may update the victim block information stored in the victim block information storage block 137A, that is, the memory block address and the error count, in response to the comparison result between the error counts.

The error count may indicate the number of corrected error bits of the read data. Alternatively, the error count may indicate the number of error bits detected from the read data. The error count may indicate the number of correctable error bits of the read data, or the number of uncorrectable error bits of the read data. The error count may become an error count of a page containing the largest number of errors among a plurality of pages included in a memory block. Alternatively, the error count may become a sum of error counts of all pages included in the memory block.

Figure 3:
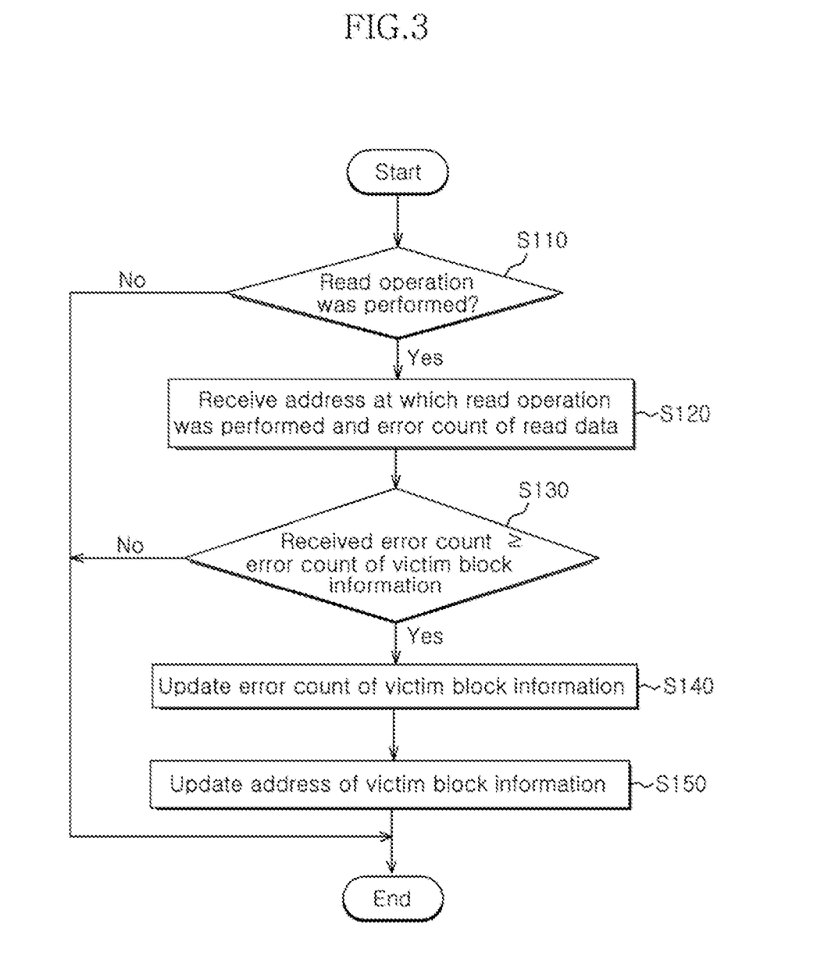
FIG. 3 is a flowchart illustrating an operation of a victim block setup unit according to an exemplary embodiment of the present invention.

FIG. 3 is a flowchart illustrating an operation of the victim block setup unit 137 according to an exemplary embodiment of the present invention.

Referring to FIGS. 2 and 3, a victim block setting operation of the victim block setup unit 137 will be described in detail.

At step S110, the victim block setup control block 137B may determine whether or not a read operation was performed. When the read operation was not performed, the procedure may be ended since an error count may not be detected. On the other hand, when the read operation was performed, an error count of read data may be detected. Thus, the procedure may proceed to step S120.

At step S120, the victim block setup control block 137B may receive an address at which the read operation was performed from the MCU, and receive an error count of read data from the ECC unit 135. The victim block setup control block 137B may receive an address of a page at which the read operation was performed as the address. Alternatively, the victim block setup control block 137B may receive an address of a memory block, which includes the page, at which the read operation was performed as the address.

At step S130, the victim block setup control block 137B may determine whether or not the error count received from the ECC unit 135 is equal to or greater than an error count of victim block information stored in the victim block information storage block 137A. When the received error count is less than the error count of the victim block information, the victim block information may not be changed, and the victim block setting operation may be ended. For this reason, a current victim block may be maintained. On the other hand, when the received error count is equal to or greater than the error count of the victim block information, the procedure may proceed to step S140 to set a new victim block.

At step S140, the victim block setup control block 137B may update the error count of the victim block information stored in the victim block information storage block 137A. For example, the victim block setup control block 137B may update the error count stored in the victim block information storage block 137A into the error count received from the ECC unit 135 at step S120.

At step S150, the victim block setup control block 137B may update an address of the victim block information stored in the victim block information storage block 137A. For example, the victim block setup control block 137B may update the address stored in the victim block information storage block 137A into the address at which the read operation was performed at step S110.

Through the steps S140 and S150, new victim block information may be stored in the victim block information storage block 137A. The new victim block information may include address information having the highest error count among addresses at which a read operation was performed. For example, the address information may include an address of a page at which a read operation was performed, or an address of a memory block including the page at which the read operation was performed. Furthermore, the new victim block information may include the highest error count information among error counts detected at which a read operation was performed.

According to the exemplary embodiment of the present invention, the victim block setup unit 137 may maintain a current victim block or update the victim block, based on an error count provided through a read operation. For example, the victim block setup unit 137 may set a memory block having the highest error count to a victim block.

Figure 4:
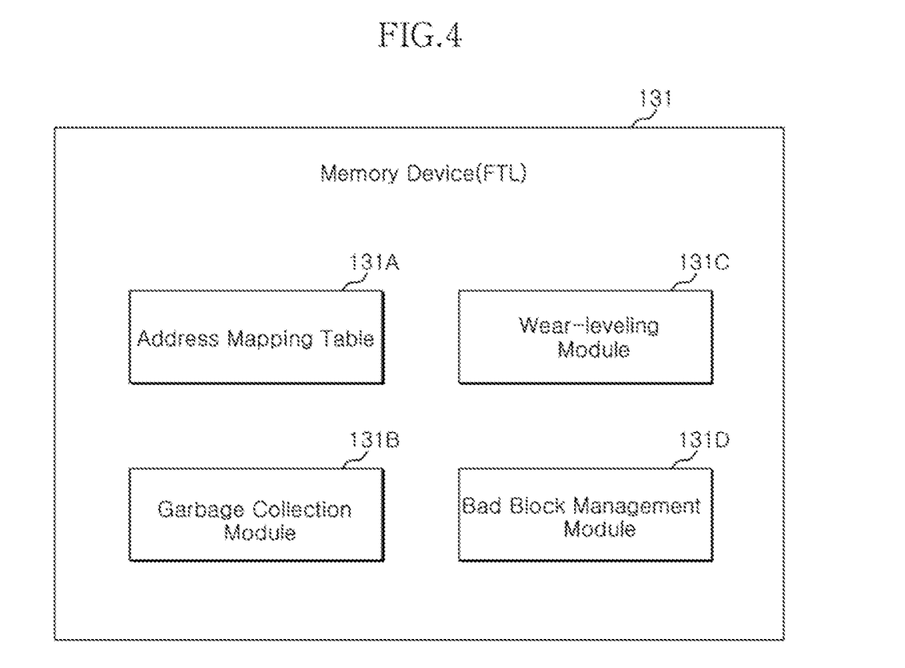
FIG. 4 is a diagram explaining firmware which is executed in the memory device of FIG. 2.

FIG. 4 is a diagram explaining firmware, which is executed in the memory device 131 of FIG. 2.

Referring to FIG. 4, an FTL loaded into the memory device 131 may include a plurality of modules. For example, the FTL may include an address mapping table 131A, a garbage collection module 131B, a wear-leveling module 131C, and a bad block management module 131D. However, the configuration of the FTL is not limited to the above-described modules. For example, the FTL may further include an interleaving module (not shown) for operating a plurality of nonvolatile memory devices in parallel to each other and a sudden power-off management module (not shown) for preparing for an unexpected power-off.

When the host device 110 accesses the data storage device 120 to request a read or write operation, the host device 110 may provide a logical address to the data storage device 120. The FTL may convert the logical address into a physical address used in the flash memory device 140, and perform the read or write operation based on the physical address. The FTL may manage the address mapping table 131A including address conversion data for the address conversion operation.

The garbage collection module 131B may manage the memory blocks 141 of the nonvolatile memory device 140 shown in FIG. 1, in which data segments are stored. The nonvolatile memory device 140 may not perform an overwrite operation, but may have a program unit larger than an erase unit. For this reason, the nonvolatile memory device 140 requires an operation of collecting valid data distributed at physically different positions into the same address area using an arbitrary empty space when the storage space thereof reaches a predetermined limit. The garbage collection module 131B may perform a plurality of write operations and a plurality of erase operations to collect valid data segments into the same address area.

The wear-leveling module 131C may manage wear levels of the memory blocks 141 of the nonvolatile memory device 140. The memory cells of the nonvolatile memory device 140 may be aged through program and erase operations. The aged memory cells, that is, the worn memory cells may cause a defect such as a physical defect. The wear-leveling module 131C may manage the wear levels of the memory blocks 141 so that program-erase counts of the respective memory blocks 141 are leveled off, in order to prevent a specific memory block of the nonvolatile memory device 140 from being worn more quickly than other memory blocks. For example, the wear-leveling module 131C may copy valid data of a relatively more worn memory block, that is, a memory block having a higher program-erase count, into a relatively less worn memory block, that is, a memory block having a smaller high program-erase count. The wear-leveling module 131C may manage the wear levels of the memory blocks 141 so that the relatively more worn memory block may not be used for a while.

The bad block management module 131D may manage a memory block having a defect among the memory blocks 141 of the nonvolatile memory device 140. As described above, a worn memory cell may have a defect such as a physical defect. Data stored in the memory cell having a defect may not be normally read. Furthermore, data may not be normally stored in the memory cell having a defect. The bad block management module 131D may perform an operation of copying valid data of a memory block including the memory cell having a defect into a normal memory block. Furthermore, the bad block management module 131D may prevent the memory block including the memory cell having a defect from being used.

While the garbage collection operation, the wear-leveling operation and the bad block management operation are performed, a merge operation may be performed. That is, during the operation of the data storage device 120 of FIG. 1, an operation of copying valid data of a victim block into another memory block, and managing the victim block having stored the valid data may be frequently performed. The operation of managing the victim block may include erasing the victim block, delaying the use of the victim block, and discarding the victim block. According to the exemplary embodiment of the present invention, the victim block may be finally selected in response to the victim block information set by the victim block setup unit 137 of FIG. 1.

Figure 5:
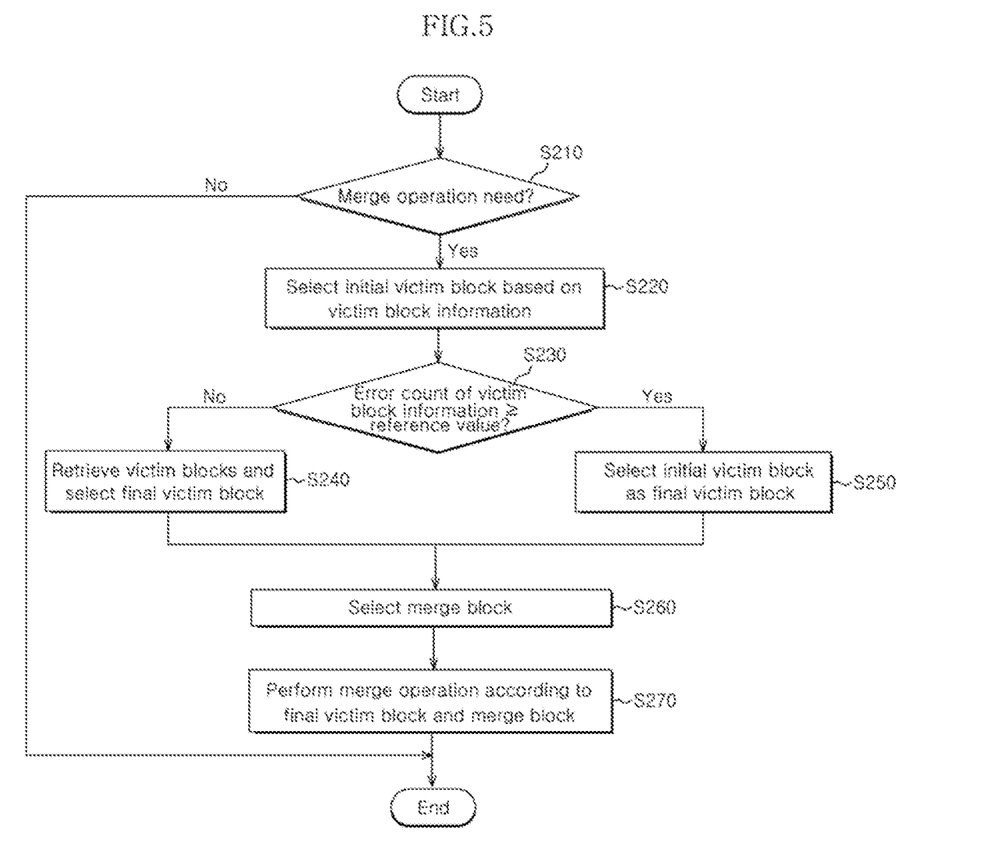
FIG. 5 is a flowchart explaining an operating method of a data storage device according to an exemplary embodiment of the present invention.

FIG. 5 is a flowchart explaining an operating method of a data storage device according to an exemplary embodiment of the present invention.

Referring to FIGS. 1 to 5, a merge operation of the data storage device 120 will be described in detail.

At step S210, the controller 130 may determine whether or not the merge operation is needed. For example, the controller 130 may determine whether or not the merge operation is needed through a garbage collection operation, a wear-leveling operation, and a bad block management operation. When it is determined that the merge operation is not needed, the procedure may be ended. On the other hand, when it is determined that the merge operation is needed, the procedure may proceed to step S220.

At step S220, the controller 130 may select an initial victim block based on victim block information stored in the victim block setup unit 137. For example, the controller 130 may refer to an address of the victim block information, and select a memory block corresponding to the address as the initial victim block. Since the initial victim block is selected based on the victim block information stored through the process of FIG. 3, a memory block having the highest error count may be selected as the initial victim block.

At step S230, the controller 130 may determine whether or not an error count of the initial victim block is equal to or greater than a reference value by comparing the error count of the initial victim block with the reference value. The reference value may be set in consideration of the reliability and/or performance of the data storage device 120. For example, the reference value may be set to a given value, which is enough to increase the reliability of the data storage device 120. When the reference value is set to a greater value, the possibility that the initial victim block set by the victim block setup unit 137 will be selected as a final victim block may decrease. Herein, the final victim block may be selected in response to another criterion for selecting a victim block. For another example, the reference value may be set to a given value to improve the performance of the data storage device 120, that is, the operating speed. When the reference value is set to a smaller value, the possibility that the initial victim block set by the victim block setup unit 137 will be selected as the final victim block may increase.

Subsequently, the controller 130 may select the initial victim block as the final victim block at step S250, or select the final victim block by retrieving other victim blocks step S240 in response to the comparison result between the error count of the initial victim block and the reference value. That is, the controller 130 may selectively performed any one of steps S240 and S250 in response to the comparison result between the error count of the initial victim block and the reference value.

When the error count of the victim block information is less than the reference value, the procedure may proceed to step S240. At step S240, the controller 130 may retrieve the other victim blocks in response to another criterion and may select the final victim block in response to the retrieval result, in order to select a victim block different from the initial victim block set by the victim block setup unit 137. For example, the controller 130 may retrieve memory blocks based on the number (or size) of valid pages (or valid data). Furthermore, the controller 130 may select a memory block having a smaller number (or size) of valid pages (or valid data) as the final victim block. For another example, the controller 130 may retrieve memory blocks based on wear-leveling information. Furthermore, the controller 130 may select a memory block having a higher wear-level, that is, a higher program-erase count as the final victim block.

When the error count of the victim block information is equal to or greater than the reference value, the procedure may proceed to step S250. At step S250, the controller 130 may maintain the victim block by selecting the initial victim block set by the victim block setup unit 137 as the final victim block.

At step S260, the controller 130 may select a new block for copying valid pages of the victim block, that is, a merge block. For example, the merge block may include an empty memory block, which stores no data. For another example, the merge block may include a memory block, which stores data but has a space to store additional data.

At step S270, the controller 130 may perform a merge operation depending on the final victim block and the merge block. The final victim block may include a victim block selected through any one of the steps S240 and S250. The controller 130 may perform the merge operation of storing valid data of the final victim block in the space of the merge block.

Figure 6:
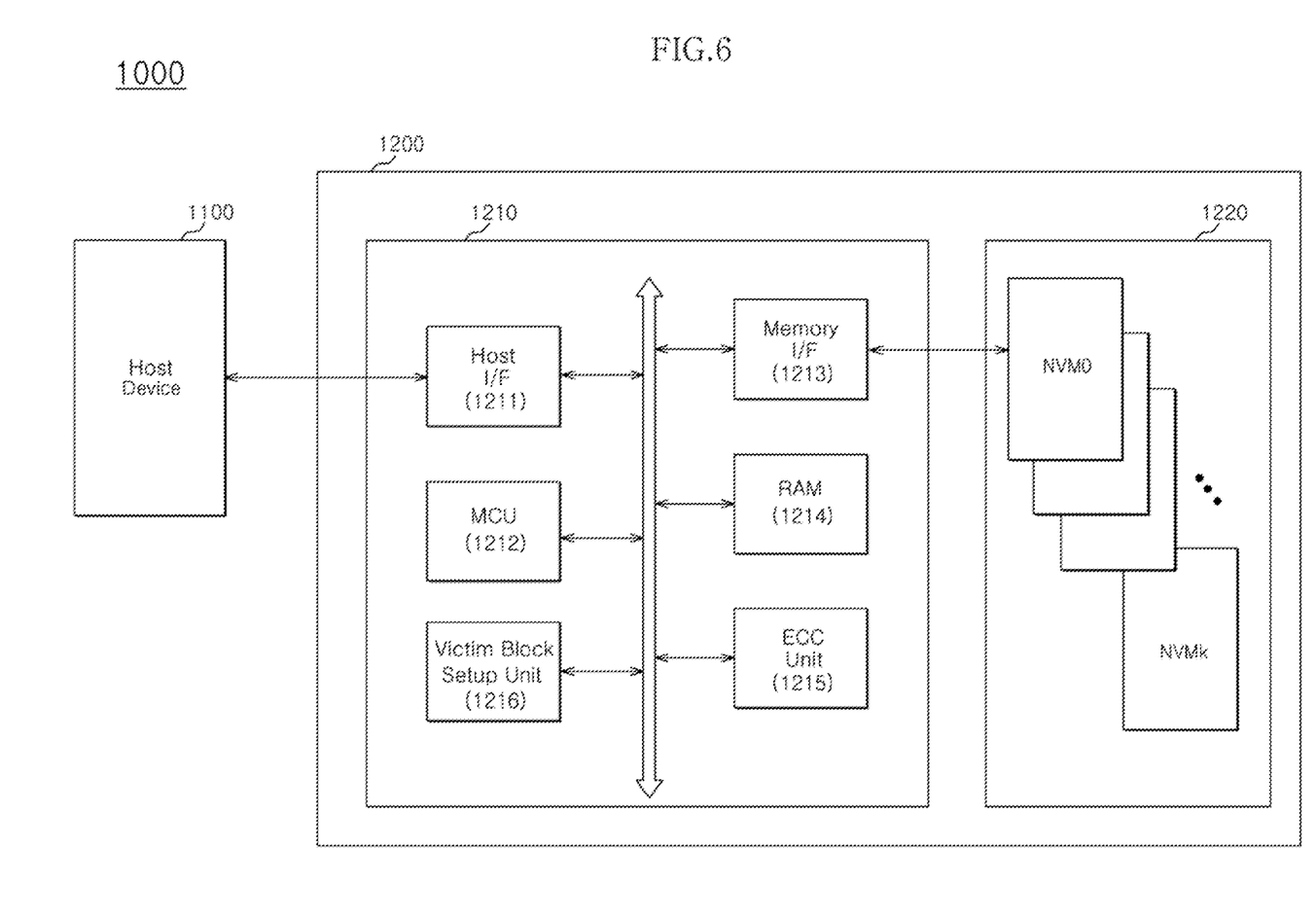
FIG. 6 is a block diagram illustrating a data processing system according to an exemplary embodiment of the present invention.

FIG. 6 is a block diagram illustrating a data processing system according to an exemplary embodiment of the present invention.

Referring to FIG. 6, the data processing system 1000 may include a host device 1100 and a data storage device 1200.

The data storage device 1200 may include a controller 1210 and a nonvolatile memory device 1220. The data storage device 1200 may be coupled to the host device 1100 such as a desktop computer, a notebook computer, a digital camera, a mobile phone, an MP3 player, a game machine, or the like. The data storage device 1200 is also referred to as a memory system.

The controller 1210 may access the nonvolatile memory device 1220 in response to a request from the host device 1100. For example, the controller 1210 may control a read, program, or erase operation of the nonvolatile memory device 1220. The controller 1210 executes firmware for controlling the nonvolatile memory device 1220.

The controller 1210 may include a host interface 1211, a micro control unit 1212, a memory interface 1213, a RAM 1214, an ECC unit 1215, and a victim block setup unit 1216.

The micro control unit 1212 may control overall operations of the controller 1210 in response to a request from the host device 1100. The RAM 1214 may serve as a memory of the micro control unit 1212. The RAM 1214 may temporarily store data read from the nonvolatile memory device 1220 or data provided from the host device 1100.

The host interface 1211 may interface the host device 1100 with the controller 1210. For example, the host interface 1211 may communicate with the host device 1100 through one of various interface protocols such as a Universal Serial Bus (USB) protocol, a Multimedia Card (MMC) protocol, a Peripheral Component Interconnection (PCI) protocol, a PCI-Express (PCI-E) protocol, a Parallel Advanced Technology Attachment (PATA) protocol, a Serial Advanced Technology Attachment (SATA) protocol, a Small Computer System Interface (SCSI) protocol, a Serial Attached SCSI (SAS) protocol, and an Integrated Drive Electronics (IDE) protocol.

The memory interface 1213 may interface the controller 1210 with the nonvolatile memory device 1220. The memory interface 1213 may provide a command and address to the nonvolatile memory device 1220. Furthermore, the memory interface 1213 may exchange data with the nonvolatile memory device 1220.

The ECC unit 1215 may detect errors of the data read from the nonvolatile memory device 1220. Furthermore, the ECC unit 1215 may correct the detected errors when the number of the detected errors falls within a correction range. The ECC unit 1215 may be provided inside or outside the controller 1210 depending on the memory system 1000.

The victim block setup unit 1216 may set a victim block based on error counts of memory blocks of the nonvolatile memory device 1220 or pages included in the memory blocks, and store victim block information. The victim block information set by the victim block setup unit 1216 may be used during a merge operation of the micro control unit 1212.

The controller 1210 and the nonvolatile memory device 1220 may be integrated into one semiconductor device to form a memory device. For example, the controller 1210 and the nonvolatile memory device 1220 may be integrated into one semiconductor device to form a personal computer memory card international association (PCMCIA) card, a compact flash (CF) card, a smart media card (SMC), a memory stick, a multi-media card (MMC, RS-MMC, or MMC-micro), a secure digital card (SD, Mini-SD, or Micro-SD), a universal flash storage (UFS) device, or the like.

Figure 7:
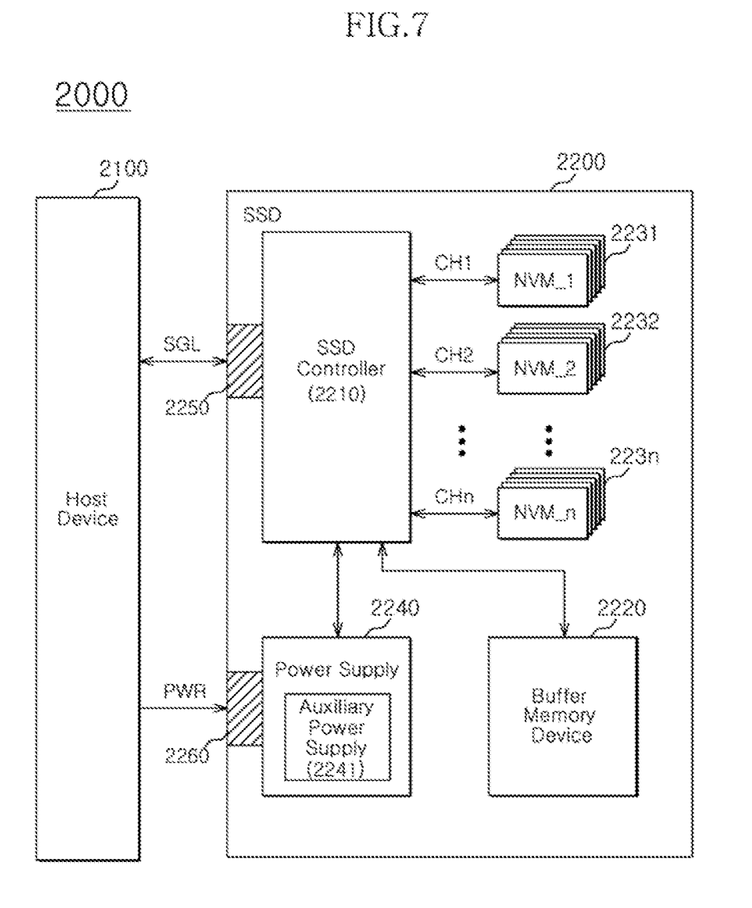
FIG. 7 is a block diagram illustrating an SSD according to an exemplary embodiment of the present invention.

FIG. 7 is a block diagram illustrating an SSD according to an exemplary embodiment of the present invention.

Referring to FIG. 7, a data processing system 2000 includes a host device 2100, and an SSD 2200.

The SSD 2200 may include an SSD controller 2210, a buffer memory device 2220, a plurality of nonvolatile memory devices 2231 to 223n, a power supply 2240, a signal connector 2250, and a power connector 2260.

The SSD 2200 may operate in response to a request from the host device 2100. That is, the SSD controller 2210 may access the nonvolatile memory devices 2231 to 223n in response to a request from the host device 2100. For example, the SSD controller 2210 may control read, program, and erase operations of the nonvolatile memory devices 2231 to 223n.

The buffer memory device 2220 may temporarily store data which are to be stored in the nonvolatile memory devices 2231 to 223n. Furthermore, the buffer memory device 2220 may temporarily store data read from the nonvolatile memory devices 2231 to 223n. The data temporarily stored in the buffer memory device 2220 may be transmitted to the host device 2100 or the nonvolatile memory devices 2231 to 223n, under the control of the SSD controller 2210.

The respective nonvolatile memory devices 2231 to 223n may serve as storage media of the SSD 2200. The respective nonvolatile memory devices 2231 to 223n may be coupled to the SSD controller 2210 through a plurality of channels CH1 to CHn. One channel may be coupled to one or more nonvolatile memory devices. The nonvolatile memory devices coupled to one channel may be coupled to the same signal bus and data bus.

The power supply 2240 may provide power PWR inputted through the power connector 2260 into the SSD 2200. The power supply 2240 includes an auxiliary power supply 2241. The auxiliary power supply 2241 may supply power to normally terminate the SSD 2200 when a sudden power off occurs. The auxiliary power supply 2241 may include super capacitors capable of storing the power PWR.

The SSD controller 2210 may exchange signals SGL with the host device 2100 through the signal connector 2250. Here, the signals SGL may include commands, addresses, data, and the like. The signal connector 2250 may include a connector such as a Parallel Advanced Technology Attachment (PATA), a Serial Advanced Technology Attachment (SATA), a Small Computer System Interface (SCSI), and a Serial Attached SCSI (SAS), according to the interface scheme between the host device 2100 and the SSD 2200.

Figure 8:
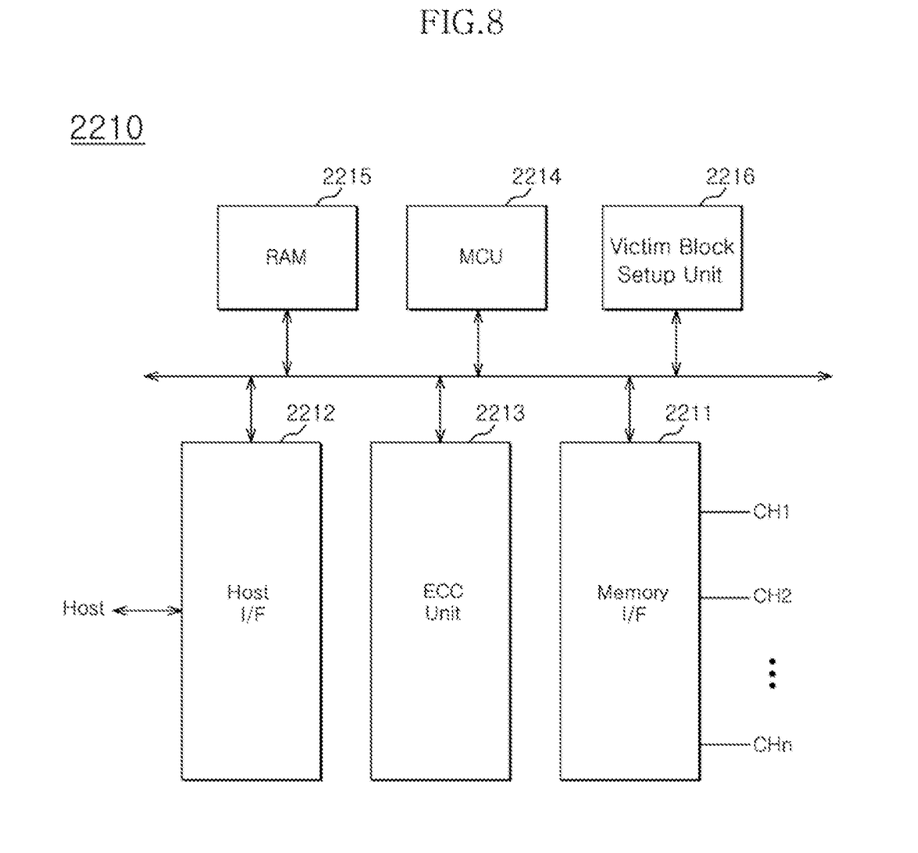
FIG. 8 is a block diagram illustrating an SSD controller illustrated in FIG. 7.

FIG. 8 is a block diagram illustrating the SSD controller shown in FIG. 7.

Referring to FIG. 8, the SSD controller 2210 includes a memory interface 2211, a host interface 2212, an ECC unit 2213, a micro control unit 2214, a RAM 2215, and a victim block setup unit 2216.

The memory interface 2211 may provide a command and address to the nonvolatile memory devices 2231 to 223n. Furthermore, the memory interface 2211 may exchange data with the nonvolatile memory devices 2231 to 223n. The memory interface 2211 may scatter data transferred from the buffer memory device 2220 over the respective channels CH1 to CHn under the control of the micro control unit 2214. Furthermore, the memory interface 2211 may transfer data read from the nonvolatile memory devices 2231 to 223n to the buffer memory device 2220 under the control of the micro control unit 2214.

The host interface 2212 may interface the SSD 2200 with the host device 2100 in response to the protocol of the host device 2100. For example, the host interface 2212 may communicate with the host device 2100 through any one of a Parallel Advanced Technology Attachment (PATA), a Serial Advanced Technology Attachment (SATA), a Small Computer System Interface (SCSI), a Serial Attached SCSI (SAS) protocols, and the like. Furthermore, the host interface 2212 may perform a disk emulation function of supporting the host device 2100 to recognize the SSD 2200 as a hard disk drive (HDD).

The ECC unit 2213 may generate parity bits based on the data transmitted to the nonvolatile memory devices 2231 to 223n. The generated parity bits may be stored in spare areas of the nonvolatile memory devices 2231 to 223n. The ECC unit 2213 may detect errors of data read from the nonvolatile memory devices 2231 to 223n. When the number of the detected errors falls within a correction range, the ECC unit 2213 may correct the detected errors.

The micro control unit 2214 may analyze and process the signal SGL inputted from the host device 2100. The micro control unit 2214 may control overall operations of the SSD controller 2210 in response to a request from the host device 2100. The micro control unit 2214 may control the operations of the buffer memory device 2220 and the nonvolatile memory devices 2231 to 223n based on firmware for driving the SSD 2200. The RAM 2215 may serve as a memory device for executing the firmware.

The victim block setup unit 2216 may set a victim block based on error counts of memory blocks of the nonvolatile memory devices 2231 to 223n, or pages included in the memory blocks, and store victim block information. The victim block information set by the victim block setup unit 2216 may be used during a merge operation of the micro control unit 2212.

Figure 9:
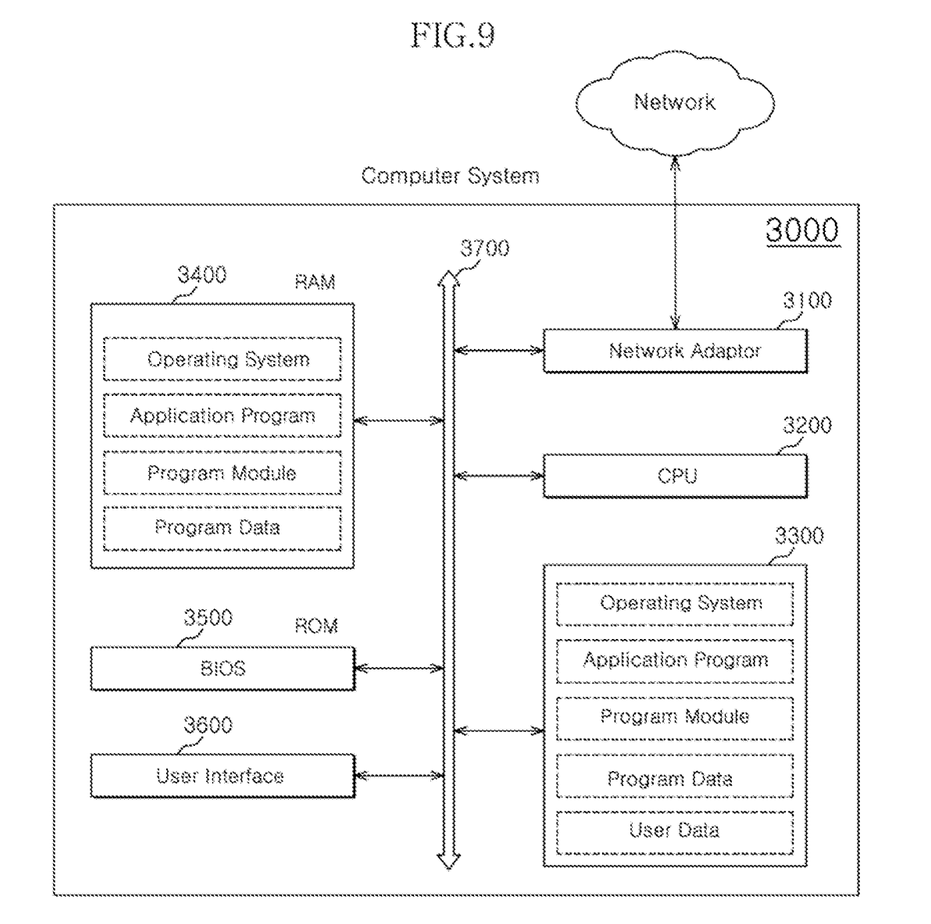
FIG. 9 is a block diagram illustrating a computer system according to an exemplary embodiment of the present invention.

FIG. 9 is a block diagram illustrating a computer system in which the data storage device according to an exemplary embodiment of the present invention is mounted.

Referring to FIG. 9, the computer system 3000 may include a network adapter 3100, a CPU 3200, a data storage device 3300, a RAM 3400, a ROM 3500, and a user interface 3600, which are electrically coupled to the system bus 3700. The data storage device 3300 may include the data storage device 120 illustrated in FIG. 1, the data storage device 1200 illustrated in FIG. 6, or the SSD 2200 illustrated in FIG. 7.

The network adapter 3100 may provide interfaces between the computer system 3000 and external networks. The CPU 3200 may perform overall arithmetic operations for driving an operating system or application programs residing on the RAM 3400.

The data storage device 3300 may store overall data required by the computer system 3000. For example, the operating system for driving the computer system 3000, application programs, various program modules, program data and user data may be stored in the data storage device 3300.

The RAM 3400 may serve as a memory device of the computer system 3000. During booting, the operating system, application programs, and various program modules that are read from the data storage device 3300, and program data required for driving the programs may be loaded into the RAM 3400. The ROM 3500 may store a basic input/output system (BIOS), which is enabled before the operating system is driven. Through the user interface 3600, information exchange may be performed between the computer system 3000 and a user.

Although not illustrated, the computer system 3000 may further include a battery, application chipsets, a camera image processor (CIP), and the like.

While certain embodiments have been described above, it will be understood to those skilled in the art that the embodiments described are by way of example only. Accordingly, the data storage device described herein should not be limited based on the described embodiments. Rather, the data storage device described herein should only be limited in light of the claims that follow.

What is claimed is:

1. A data storage device comprising:
    a nonvolatile memory device; and
    a controller suitable for controlling an operation of the nonvolatile memory device in response to a request from an external device,
    wherein the controller comprises a victim block setup unit suitable for setting a victim block for a merge operation based on an error count, which is detected when a read operation of the nonvolatile memory device is performed, and for storing information of the victim block for the merge operation, and
    wherein the controller converts the victim block into a free memory block during the merge operation and reuses the free memory block to store data.

2. The data storage device according to claim 1, wherein the victim block setup unit comprises:
    a victim block information storage block suitable for storing the information of the victim block; and
    a victim block setup control block suitable for comparing a first error count stored in the victim block information storage block with a second error count detected when a read operation is performed, and for setting the victim block for the merge operation in response to the comparison result.

3. The data storage device according to claim 2, wherein the victim block setup control block updates the information of the victim block stored in the victim block information storage block, when the second error count is equal to or greater than the first error count.

4. The data storage device according to claim 3, wherein the victim block setup control block updates an error count information stored in the victim block information storage block with the second error count.

5. The data storage device according to claim 3, wherein the victim block setup control block updates an address information stored in the victim block information storage block with a page address or memory block address at which the read operation is performed.

6. The data storage device according to claim 2, wherein the victim block setup control block maintains the victim block information stored in the victim block information storage block, when the second error count is less than the first error count.

7. The data storage device according to claim 1, wherein the controller further comprises an error correction code (ECC) unit suitable for detecting and correcting an error of data read from the nonvolatile memory device.

8. The data storage device according to claim 7, wherein the ECC unit provides the error count to the victim block setup unit when the read operation of the nonvolatile memory device is performed.

9. The data storage device according to claim 7, wherein the ECC unit provides the error count including the number of corrected error bits of the read data, or the number of error bits detected from the read data.

10. The data storage device according to claim 1, wherein the controller performs the merge operation of copying valid data of the victim block into a merge memory block.

11. The data storage device according to claim 10, wherein the controller retrieves another victim block when the error count of the victim block is less than a reference value.

12. The data storage device according to claim 11, wherein the controller retrieves the another victim block based on a number of valid pages within the another victim block.

13. The data storage device according to claim 11, wherein the controller retrieves the another victim block based on wear-leveling information.

14. The data storage device according to claim 10, wherein the controller maintains the victim block when the error count of the victim block is equal to or greater than a reference value.

15. An operating method of a data storage device which includes a victim block setup unit, the operating method comprising:
   selecting an initial victim block based on victim block information stored in the victim block setup unit;
   comparing an error count of the initial victim block with a reference value;
   selecting the initial victim block as a final victim block, or selecting the final victim block by retrieving other victim blocks, in response to a comparison result;
   selecting a merge block into which valid data of the final victim block are to be copied;
   performing a merge operation of copying the valid data of the final victim block into the merge block;
   converting the final victim block into a free memory block; and
   reusing the free memory block to store data.

16. The operating method according to claim 15, wherein the initial victim block is selected as the final victim block when the error count of the initial victim block is equal to or greater than the reference value.

17. The operating method according to claim 15, wherein the final victim block is selected by retrieving the other victim blocks when the error count of the initial victim block is less than the reference value.

18. The operating method according to claim 17, wherein the selecting the final victim block by retrieving other victim blocks comprises retrieving memory blocks including valid data with a smaller size, or retrieving memory blocks having a higher program-erase count.

19. The operating method according to claim 15, further comprising:
   receiving an address at which a read operation was performed and an error count of read data;
   comparing a received error count with an error count of the victim block information stored in the victim block setup unit; and
   when the received error count is equal to or greater than the error count of the victim block information, updating the error count of the victim block information with the received error count, and updating an address of the victim block information with a received address.

20. A data processing system comprising:
   a host device; and
   a data storage device suitable for storing data processed by the host device, wherein the data storage device comprises:
   a nonvolatile memory device; and
   a controller suitable for controlling an operation of the nonvolatile memory device in response to a request from the host device, and
   wherein the controller comprises a victim block setup unit suitable for setting a victim block for a merge operation based on an error count, which is detected when a read operation of the nonvolatile memory device is performed, and storing information of the victim block for the merge operation, and
   wherein the controller converts the victim block into a free memory block during the merge operation and reuses the free memory block to store data.

* * * * *